UNITED STATES PATENT OFFICE.

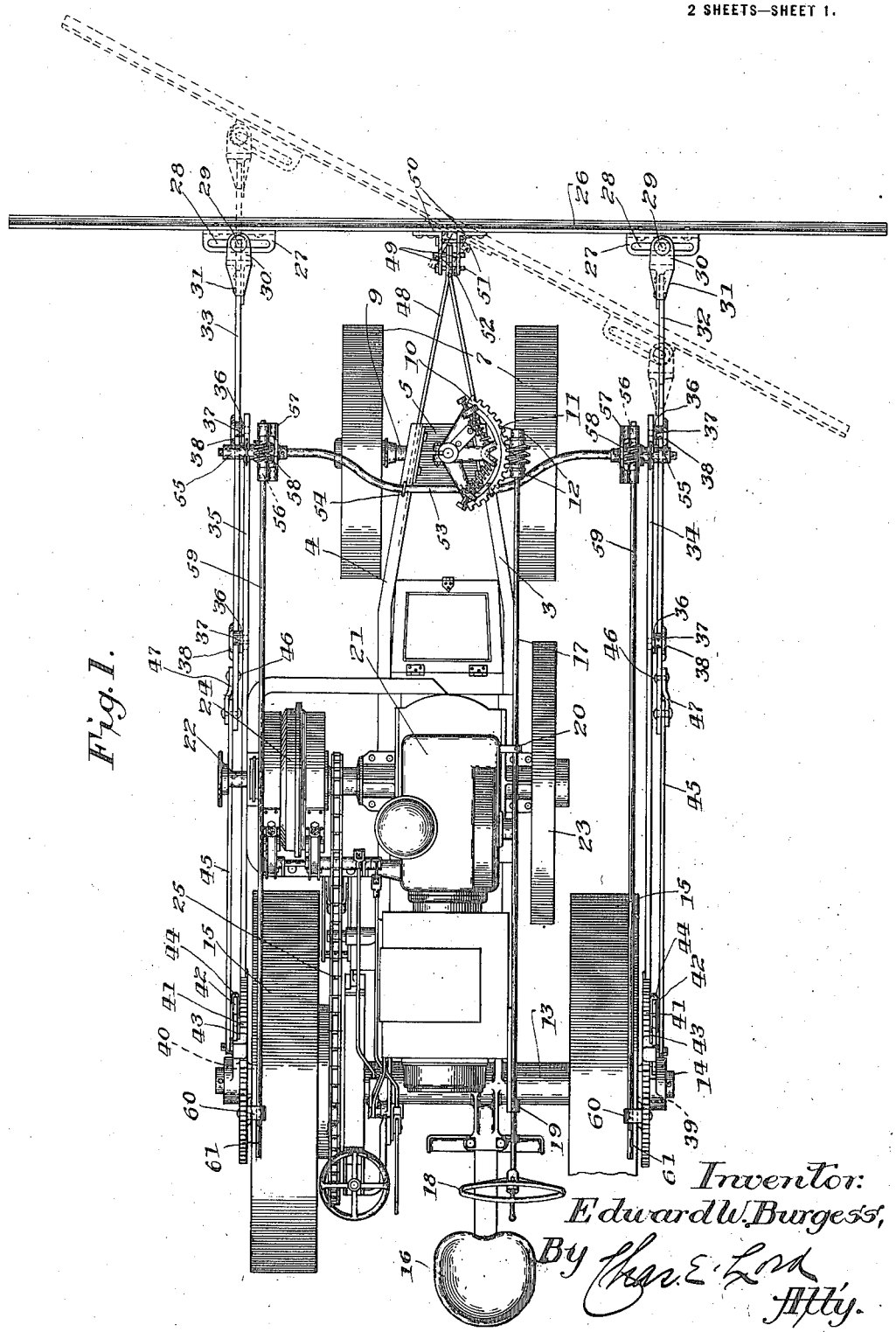

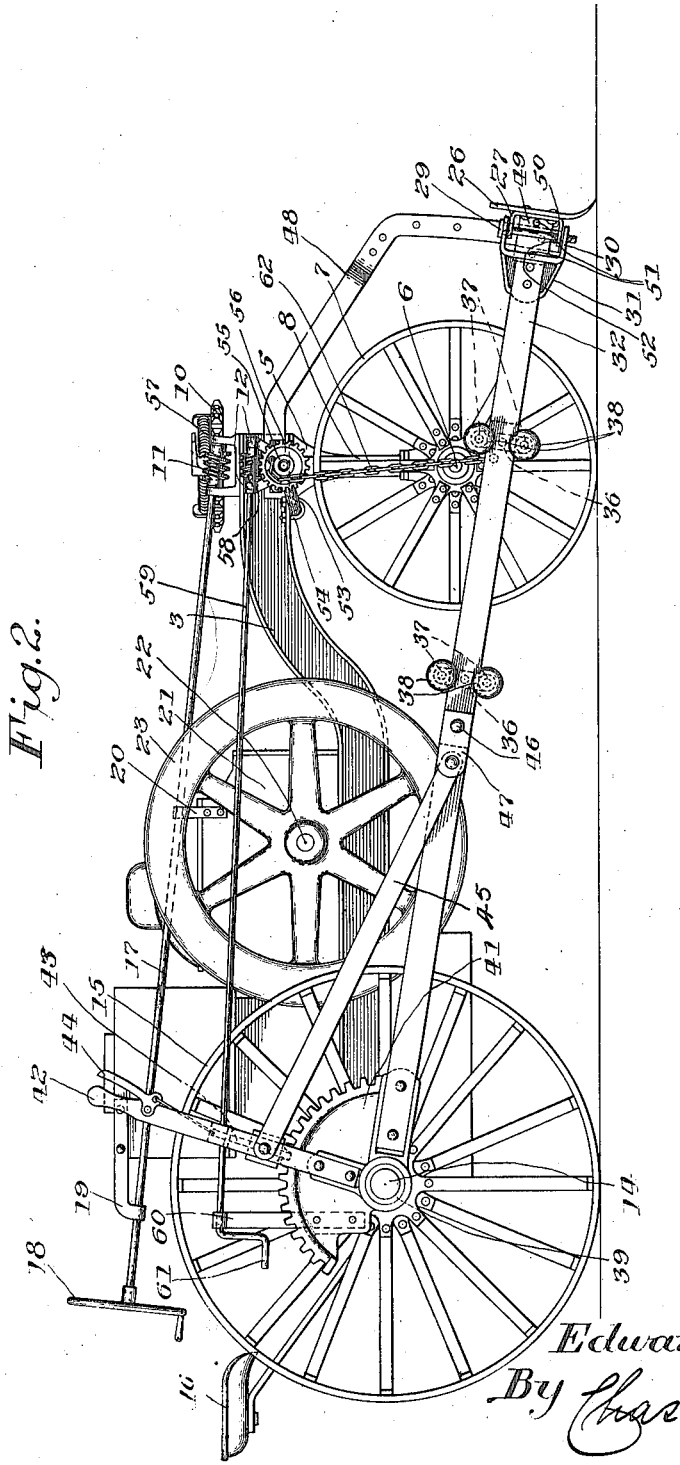

EDWARD W. BURGESS, OF CHICAGO, ILLINOIS, ASSIGNOR TO INTERNATIONAL HARVESTER COMPANY OF NEW JERSEY, A CORPORATION OF NEW JERSEY.

ROAD-GRADER.

1,233,840.    Specification of Letters Patent.    Patented July 17, 1917.

Application filed July 17, 1916. Serial No. 109,753.

*To all whom it may concern:*

Be it known that I, EDWARD W. BURGESS, a citizen of the United States, residing at Chicago, in the county of Cook and State of Illinois, have invented certain new and useful Improvements in Road-Graders, of which the following is a full, clear, and exact specification.

My invention relates to road graders, and in particular to an implement of the class indicated adapted to be propelled in front of a traction engine and having its adjustable parts controlled by an operator from the seat of the tractor, the object of my invention being to provide a construction that will be rigid and strong, readily attachable or detachable to or from a tractor, easily adjustable at varying angles and in varying operative planes, and efficient in operation.

I attain this object by means of the mechanism illustrated in the accompanying drawings, in which—

Figure 1 is a top plan view of a tractor and road grader attachment embodying my invention; and Fig. 2 is a side elevation of Fig. 1.

The same reference characters designate like parts throughout the several views.

The tractor includes longitudinally disposed right and left hand truck frame members 3 and 4, respectively, a bolster member 5 secured to the front ends thereof, a steering axle 6 having steering wheels 7 journaled upon the opposite ends thereof, a vertically disposed spindle 8 having its lower end operatively connected to the steering axle, a depending tubular frame member 9 secured to the bolster member 5 and having the spindle 8 journaled therein, a worm sector 10 secured to the upper end of the spindle, a worm 11 journaled in bearings 12 carried by the truck frame and engaging with the worm sector, a transversely disposed tubular frame member 13 secured to the rear ends of the truck frame members 3 and 4 and having an axle 14 journaled therein having traction wheels 15 mounted upon its opposite ends, an operator's seat 16 carried by the truck frame, and a longitudinally disposed steering shaft 17 having its front end connected with the worm 11 and its rear end provided with a hand operated steering wheel 18, the rear end of the shaft being journaled in a bracket member 19 and its middle in a bracket 20.

The engine includes a power cylinder 21, a power shaft 22, a fly wheel 23, and a power transmission gear mechanism 24 operatively connected with the axle 14 by means including a sprocket chain 25.

The grader attachment includes a transversely disposed blade 26 in front of the tractor, vertically disposed U-shaped bracket members 27 secured to the rear side of the blade and provided with transverse slotted openings 28 in their rearwardly extending arms adapted to receive hinge pins 29 whereby the brackets are pivotally connected with forwardly extending ear members 30 integral with bracket members 31 secured to the front ends of longitudinally disposed push bars 32 and 33 at the right and left hand sides of the tractor, respectively, supplemental longitudinally disposed bars 34 and 35 having their front ends overlapping the bars 32 and 33, respectively, and secured thereto are vertically disposed bracket members 36 spaced apart upon the bars and provided with outwardly extending studs 37, upon which are journaled flanged rollers 38 that receive the upper and lower edges of the push bars 32 and 33. The rear ends of the bars 34 and 35 are secured to sleeve members 39 and 40, respectively, journaled upon opposite ends of the tractor axle 14 and having integral therewith toothed sectors 41, and coöperating therewith are adjusting levers 42 pivotally mounted upon the sleeves and carrying sliding detents 43 adapted to engage with the toothed sectors 41 and controlled by means of thumb levers 44 in a common way. 45 represents adjusting bars having their rear ends pivotally connected with the adjusting levers 42 and their front ends pivotally connected with the rear ends of the push bars 32 and 33 by means of studs 46 having one end thereof secured to the push bars and their opposite ends to strap members 47 secured to the bars. The control levers 42 are preferably mounted outside of the main frame of the tractor. 48 represents forwardly extending converging bars having their rear ends secured to the front ends of the truck frame members 3 and 4 of the tractor and their front ends curved downward concentric with the tractor axle and received between the rearwardly extending arms 49 of L-shaped bracket members 50 secured to the rear side of the grader blade 26 at its middle. 51 represents pins received by lateral openings in the arms 49 in the bars 48, and 52 a pin carried by the lower ends of the bars 48, the pins being operative to prevent an accidental separation of the arms from the bracket members. 53 represents a transversely disposed yoke member secured to the bottom of the truck frame members 3 and 4 by means of U bolts 54. Rotatably mounted upon opposite ends of the yoke are sleeve members 55 having integral therewith worm wheels 56, and journaled in brackets 57 secured to the yoke are worms 58 engaging with the worm wheels. The worms are connected with the front ends of longitudinally disposed shafts 59 having their rear ends journaled in bearings at the upper ends of bars 60 secured to the toothed sectors and provided with hand cranks 61. The sleeve members 55 are connected with the front ends of the bars 34 and 35 by means of chains 62 whereby the bars and blade may be raised or lowered upon either side of the tractor separately.

In operation the grader blade is propelled in front of the tractor, either at right angles with the line of travel thereof, as shown by full lines in Fig. 1, or it may be inclined relative to the line of travel as desired, as shown by dotted lines; the adjusting levers 42 being manipulated forward or backward to adjust the push bars 32 and 33 longitudinally upon the flanged rollers 38, the slotted openings 28 in the bracket members 27 permitting a free movement of the bars relative to the blade. The blade may be raised or lowered at either end or its operative angle reversed as desired, and the arms 48 prevent a lateral movement of the blade relative to the tractor when in operation.

Having shown and described one form which my invention may assume in practice, I do not desire that it be limited by the specific details of the structure as illustrated, it being understood that changes may be made in the form, proportion and organization of its associated parts without departing from the spirit of the invention as indicated by the scope of the appended claims.

What I claim as new and desire to secure by Letters Patent is:

1. In combination, a tractor including a truck frame and traction and carrying wheels, a road grader including a grader blade, and means for propelling said blade in front of said tractor truck frame and carrying wheels, said means including overlapping longitudinally contractible and extensible push bars pivotally connecting said blade with opposite sides of said tractor.

2. In combination, a tractor including a truck frame and traction and carrying wheels, a road grader including a grader blade, and means for propelling said blade in front of said tractor truck frame and carrying wheels, said means including overlapping rising and falling longitudinally extensible and contractible push bars pivotally connecting opposite ends of said blade with opposite sides of said tractor.

3. In combination, a tractor including a truck frame, an axle, traction and carrying wheels, a road grader including a grader blade, and means for propelling said blade in front of said truck frame, said means including overlapping rising and falling longitudinally extensible and contractible push bars pivotally connecting opposite ends of said blade with opposite ends of said axle.

4. In combination, a tractor including a truck frame, an axle, traction and carrying wheels, a road grader including a grader blade, means for propelling said blade in front of said truck frame, said means including overlapping rising and falling longitudinally extensible and contractible push bars pivotally connecting opposite ends of said blade with opposite ends of said axle, and means for adjusting said overlapping bars longitudinally relatively and independently of each other.

5. In combination, a road grader including a grader blade, a tractor including a truck frame, an axle and traction and carrying wheels, said blade being disposed in front of said tractor wheels, blade propelling means, said means including overlapping rising and falling push bars connecting said blade with said tractor disposed upon opposite sides of and carried by said truck frame in a manner whereby said blade is wholly supported by said truck frame.

6. In combination, a tractor including a truck frame, an axle, traction and carrying wheels, a road grader including a grader blade, means for propelling said blade in front of said truck frame and carrying wheels, said means including longitudinally disposed two-part push bars having their adjacent ends overlapping each other in a slidable manner and their opposite ends pivotally connecting opposite ends of said blade with opposite sides of said tractor, and manually controllable independent means for adjusting either of said two-part push bars longitudinally.

7. In combination, a tractor including a truck frame, an axle, traction and carrying wheels, a road grader including a grader blade, means for propelling said blade in front of said truck frame and carrying wheels, said means including longitudinally disposed two-part push bars having their adjacent ends overlapping each other in a slidable manner, the front ends of said bars being pivotally connected with opposite ends of said blade and their rear ends pivotally connected with opposite ends of said axle, and manually controllable means carried by said truck frame and directly connected with said push bars whereby either push bar may be turned about said axle independently.

8. In combination, a tractor including a truck frame, an axle, traction and carrying wheels, a road grader including a grader blade, means for propelling said blade in front of said truck frame and carrying wheels, said means including longitudinally disposed two-part push bars having their adjacent ends overlapping each other in a slidable manner, the front ends of said bars being pivotally connected with opposite ends of said blade and their rear ends pivotally connected with opposite ends of said axle, manually controllable means carried by said truck frame and directly connected with said push bars whereby either push bar may be turned about said axle independently, and means carried by the front end of said truck frame and slidably engaging with said blade in a manner preventing a lateral and permitting a rising and falling movement thereof.

9. In a road grader, a grader blade, a tractor including a truck frame and axle, means for propelling said blade in front of said tractor, said means including longitudinally disposed push bars having their front ends operatively connected with opposite ends of said blade, supplemental bars disposed parallel with said push bars having their rear ends pivotally connected with opposite ends of said axle and having said push bars slidably mounted upon their front ends, and raising and lowering mechanism mounted upon said truck frame and operatively connected with the front ends of said supplemental bars.

10. In a road grader, a grader blade, a tractor including a truck frame and an axle, means for propelling said blade in front of said tractor, said means including longitudinally disposed push bars having their front ends operatively connected with opposite ends of said blade, supplemental bars disposed parallel with said push bars having their rear ends pivotally connected with opposite ends of said axle and having said push bars slidably mounted upon their front ends, a transversely disposed yoke carried by said truck frame, blade adjusting elements mounted upon opposite ends of said yoke, and operative connections between said adjusting elements and the front ends of said supplemental bars.

11. In a road grader, a grader blade, a tractor including a truck frame and axle, means for propelling said blade in front of said tractor, said means including longitudinally disposed push bars having their front ends operatively connected with opposite ends of said blade, supplemental bars disposed parallel with said push bars having their rear ends pivotally connected with opposite ends of said axle and having said push bars slidably mounted upon their front ends, a transversely disposed yoke carried by said truck frame, sleeves journaled upon opposite ends of said yoke, flexible connections between said sleeves and the front ends of said supplemental bars, and means for rotating said sleeves independently of each other.

12. In a road grader, a grader blade, a tractor including a truck frame and an axle, means for propelling said blade in front of said tractor, said means including longitudinally disposed push bars operatively connecting said blade with the opposite ends of said axle, a transversely disposed yoke carried by said truck frame, sleeves journaled upon opposite ends of said yoke, flexible connections between said sleeves and said push bars, and means for rotating said sleeves.

13. In a road grader, a grader blade, a tractor including a truck frame and an axle, means for propelling said blade in front of said tractor, said means including longitudinally disposed push bars operatively connecting said blade with the opposite ends of said axle, a transversely disposed yoke carried by said truck frame, sleeves journaled upon opposite ends of said yoke, worm wheels integral with said sleeves, worm members engaging with said wheels, flexible connections between said sleeves and said push bars, and means for rotating said worms separately.

14. In a road grader, a grader blade, a tractor including a truck frame and an axle, means for propelling said blade in front of said tractor, said means including longitudinally disposed rising and falling push bars operatively connecting said blade with opposite ends of said axle, and forwardly converging and downwardly curved bars rigidly secured to the front end of said truck frame and slidably engaging with said blade in a manner preventing a lateral movement thereof relative to said tractor and permitting a rising and falling movement of said blade bodily.

15. In a road grader, a grader blade, a tractor including a truck frame and an axle, means for propelling said blade in front of said tractor, said means including longitudinally disposed push bars having their front ends operatively connected with said blade, and supplemental bars disposed parallel with said push bars having their rear ends pivotally connected with opposite ends of said axle and having said push bars slidably mounted upon their front ends.

16. In a road grader, a grader blade, a tractor including a truck frame and an axle, means for propelling said blade in front of said tractor, said means including longitudinally disposed push bars having their front ends operatively connected with said blade, supplemental bars disposed parallel with said push bars having their rear ends pivotally connected with opposite ends of said axle and having said push bars slidably mounted upon their front ends, and means for adjusting said push bars longitudinally upon said supplemental bars.

17. In a road grader, a grader blade, a tractor including a truck frame and an axle, means for propelling said blade in front of said tractor, said means including longitudinally disposed push bars having their front ends operatively connected with said blade, supplemental bars disposed parallel with said push bars having their rear ends pivotally connected with opposite ends of said axle and having said push bars slidably mounted upon their front ends, and means for adjusting said push bars separately and in opposite directions on said supplemental bars.

18. In a road grader, a grader blade, a tractor including a truck frame and an axle, means for propelling said blade in front of said tractor, said means including longitudinally disposed push bars having their front ends operatively connected with said blade, and supplemental bars disposed parallel with said push bars having their rear ends pivotally connected with opposite ends of said axle, and flanged rollers spaced apart in the direction of the length of said supplemental bars and mounted thereon and having said push bars slidably received between said rollers.

19. In a road grader, a grader blade, a tractor including a truck frame and an axle, means for propelling said blade in front of said tractor, said means including longitudinally disposed push bars having their front ends operatively connected with said blade, supplemental bars having their rear ends pivotally connected with opposite ends of said axle and having said push bars slidably mounted upon their front ends, means for adjusting said push bars longitudinally upon said supplemental bars, said adjusting means including toothed sectors connected with said supplemental bars, adjusting levers coöperating with said sectors, and controlling bars connecting said levers with said push bars.

20. In combination, a tractor, a grader including a grader blade propelled thereby, push bars connecting the opposite ends of said grader blade to the tractor, and individually operable members for changing the effective length of one push bar relative to the other to change the angle of the grader blade relative to the line of advance.

21. In combination, a tractor, a grader including a grader blade propelled thereby, individually operable control members operated from the tractor for varying the angle of the grader relative to the line of draft, and control members independently operable from the tractor for changing the angle of the grader blade relative to the surface of the ground in a vertical plane.

In testimony whereof I affix my signature.

EDWARD W. BURGESS.